US011984096B2

(12) United States Patent
Aubineau et al.

(10) Patent No.: US 11,984,096 B2
(45) Date of Patent: May 14, 2024

(54) REDUCING MEMORY SIZE AND BANDWIDTH REQUIREMENTS FOR A NON-RECTANGULAR DISPLAY AND APPARATUS

(71) Applicant: NXP USA, Inc., Austin, TX (US)

(72) Inventors: Vincent Aubineau, Arêches (FR); Michael Andreas Staudenmaier, Munich (DE); Bastien Alain Depp, Le Blanc-Mesnil (FR)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 18/059,371

(22) Filed: Nov. 28, 2022

(65) Prior Publication Data

US 2023/0169933 A1 Jun. 1, 2023

(30) Foreign Application Priority Data

Nov. 30, 2021 (EP) .................................... 21306668

(51) Int. Cl.
*G09G 5/30* (2006.01)
*G09G 5/00* (2006.01)

(52) U.S. Cl.
CPC ............... *G09G 5/005* (2013.01); *G09G 5/30* (2013.01)

(58) Field of Classification Search
CPC ................................ G09G 5/005; G09G 5/30
See application file for complete search history.

(56) References Cited

U.S. PATENT DOCUMENTS 10,262,623 B2 4/2019 Yang
10,802,299 B2 10/2020 Kim et al.
2020/0082797 A1* 3/2020 Takemoto ................ G09G 5/39
2021/0226649 A1* 7/2021 Ortyl, III ............... H04B 1/406

FOREIGN PATENT DOCUMENTS

KR 20110066333 A 6/2011

* cited by examiner

*Primary Examiner* — Robert J Michaud

(57) ABSTRACT

An address to perform a memory operation on a memory location in a rectangular frame buffer is received. A determination is made whether the received address identifies a memory location in a non-rectangular frame buffer corresponding to a memory location in the rectangular frame buffer. Based on the determination that the received address identifies the memory location in the non-rectangular buffer, the memory operation on the memory location in the non-rectangular buffer is performed based on the translated address. Based on the determination that the received address does not identify the memory location in the non-rectangular buffer, the memory operation in the non-rectangular frame buffer is not performed.

18 Claims, 5 Drawing Sheets

GRAPHIC DATA ACCESS SYSTEM

REDUCING MEMORY SIZE AND BANDWIDTH REQUIREMENTS FOR A NON-RECTANGULAR DISPLAY AND APPARATUS

FIELD OF USE

This disclosure generally relates to display technology, and more particularly to reducing memory size and bandwidth requirements for a non-rectangular display compared to requirements of a rectangular display.

BACKGROUND

A display is an output device which presents information in visual form based on a received electrical signal. For many years, the display has been rectangular in shape resulting in use of a rectangular frame buffer to store pixel data of each pixel displayed on the display. The pixel data may be a 16 bit, 24 bit, or 32 bit value describing an illumination of the pixel. The rectangular frame buffer has lines of memory locations each with a uniform number of memory locations. Each memory location stores pixel data for a pixel and each line of memory locations stores a line of pixels data that correspond to a line of pixels that would be displayed on the rectangular display. A number of pixel data and a number of pixels are uniform for each line.

With the advent of smart watches and other modern electronic devices, displays now come in non-rectangular shapes such as a circle or ellipse. Non-rectangular displays continue to use the rectangular frame buffer to store pixel data. The rectangular frame buffer contains not only the pixel data associated with pixels displayed on the non-rectangular display, but also all pixel data of the pixels which would be visible on a rectangular display but not visible on the non-rectangular display.

Figure 1:
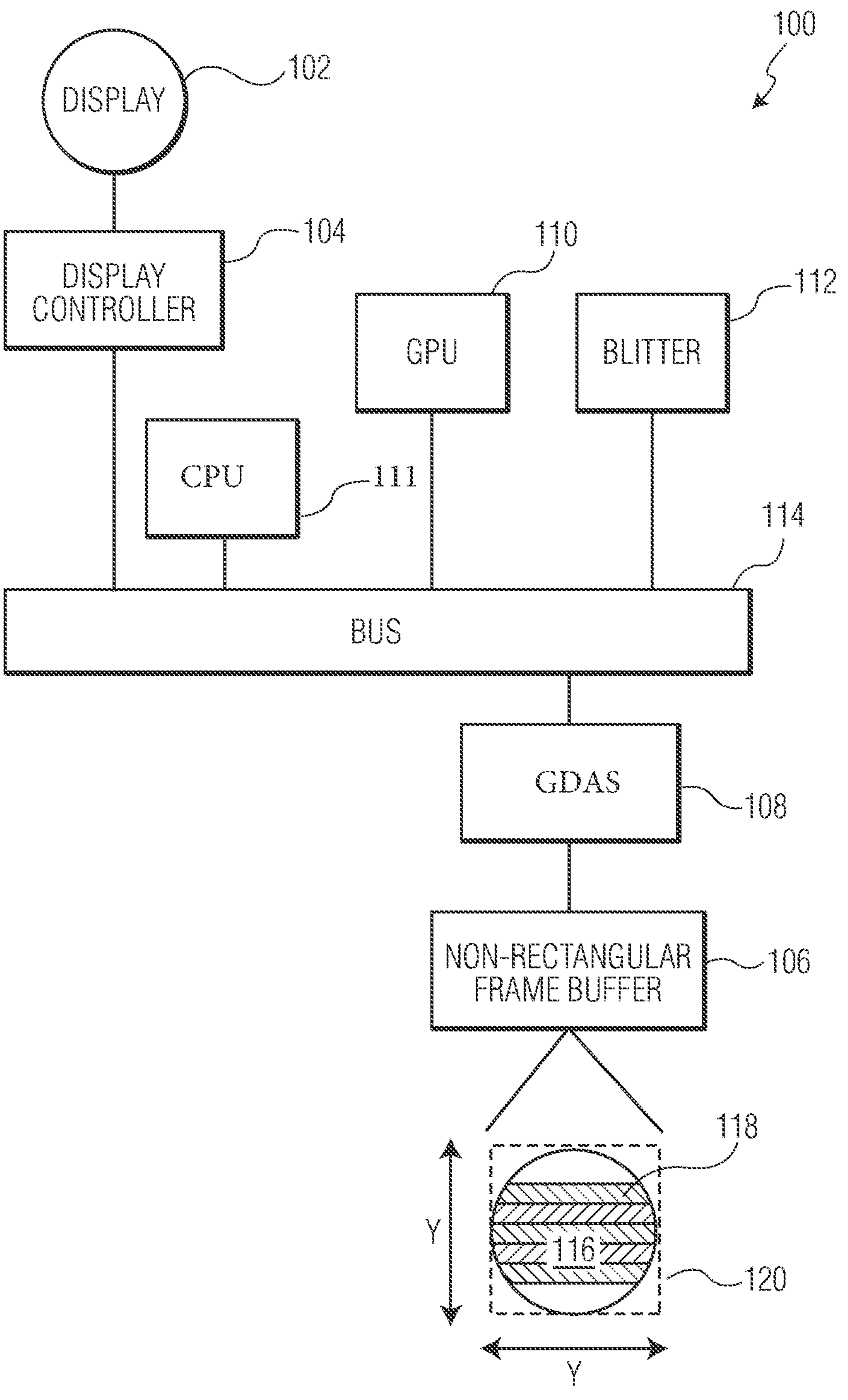
FIG. 1 is a block diagram of an example display system associated with a non-rectangular display in accordance with an embodiment.

The drawings are for the purpose of illustrating example embodiments, but it is understood that the embodiments are not limited to the arrangements and instrumentality shown in the drawings.

DETAILED DESCRIPTION

Embodiments disclosed herein are directed to storing and accessing pixel data of pixels in a non-rectangular frame buffer of a non-rectangular display rather than a rectangular frame buffer. The non-rectangular display takes many forms such as a circular display or elliptical display. The non-rectangular frame buffer is a frame buffer which stores the pixel data of pixels displayed on the non-rectangular display, but not all the pixel data of pixels which would be visible on a rectangular display.

The non-rectangular frame buffer has lines of memory locations where a number of memory locations in at least two lines varies. Each memory location stores pixel data for a pixel and each line of memory locations stores a line of pixel data corresponding to a line of pixels displayed on the non-rectangular display. A number of pixel data and associated number of pixels vary for at least two lines. In an example, the non-rectangular frame buffer of the non-rectangular display is further subdivided into one or more segments. Each segment includes a plurality of lines of memory locations. Each line in a segment has a uniform number of memory locations but at least two segments have a different number of memory locations in a line such that lengths of the segments approximate a shape of the non-rectangular display. The use of the non-rectangular frame buffer reduces memory size and bandwidth requirements compared to storing and accessing pixel data of pixels in a rectangular frame buffer for the non-rectangular display.

A display system for displaying images on the non-rectangular display has a graphic data access system (GDAS) to access the pixel data stored in the non-rectangular frame buffer. The GDAS includes a configurable address translator (CAT), a load store (LS), and an area shape configurator (ASC). The GDAS receives an address from a display controller and performs a memory operation to read or write pixel data of a pixel at a memory location indicated by the address. The display controller generates the address to access the memory location based on the memory location being in a rectangular frame buffer. The GDAS determines whether a memory location in the non-rectangular frame buffer corresponds to the memory location addressed in the rectangular frame buffer based on a shape of the display screen indicated by the ASC. If the corresponding memory location is in the non-rectangular frame buffer, then the LS performs the read or write memory operation based on translating the address in the rectangular frame buffer to an address in the non-rectangular frame buffer. The display system then performs a read or write operation in the non-rectangular frame buffer using the address in the non-rectangular frame buffer. If the corresponding memory location is not in the non-rectangular frame buffer and the memory operation is a read operation, then the LS provides arbitrary data. If the corresponding memory location is not in the non-rectangular frame buffer and the memory operation is a write operation, then the LS does not perform the write memory operation. Well known instructions, protocols, structures, and techniques have not been shown in detail in order not to obfuscate the description.

FIG. 1 is a block diagram of an example display system 100 associated with a non-rectangular display in accordance with an embodiment. The display system 100 includes one or more of a display 102, a display controller 104, a non-rectangular frame buffer 106, and a graphics data access system (GDAS) 108 each implemented using circuitry such as analog circuitry, mix signal circuitry, memory circuitry, logic circuitry, processing circuitry arranged to execute code stored in a memory and when executed by the processing circuitry perform the disclosed functions, or combinations thereof. A bus 114 such as a cross bar bus matrix may facilitate communication between the display controller 104, the non-rectangular frame buffer 106, and the GDAS 108 associated with operation of the display 102 as described herein.

The display 102 is an electronic device which displays images composed of pixels which produce an illumination on the display 102 to convey information in visual form. The display 102 may be a computer screen, watch, or control panel such as a speedometer in a vehicle in some examples. In an example, the display 102 may be a non-rectangular shape such as an ellipse of which a circle is an example of an ellipse with equal major and minor axes. The display controller 104 which is coupled to the display 102 may control operation of the display 102 including causing the display 102 to illuminate certain pixels of the display 102. The display controller 104 may receive pixel data stored in the non-rectangular frame buffer 106 corresponding to the pixels to be illuminated and provide the pixel data to the display 102 to cause the pixels to be illuminated based on the pixel data.

The non-rectangular frame buffer 106 may be a frame buffer implemented in a storage device such as random access memory (RAM) or non-volatile memory with a plurality of addressable memory locations for storing data. Examples of RAM may include static RAM (SRAM) or dynamic RAM (DRAM). The non-rectangular frame buffer 106 has lines of memory locations with at least two lines having a varying number of memory locations. Each memory location may store pixel data for a pixel. For instance, the pixel data for as pixel may be a 16 bit, 24 bit, or 32 bit value describing an illumination of a pixel. The 16 bit or 32 bit value for the pixel data may be preferable to the 24 bit value because the non-rectangular frame buffer 106 may allow 16, 32, or 64 bit memory accesses and a 24 bit value may require two memory accesses. A plurality of 16 bit, 24 bit, or 32 bit values may be an example of pixel data of pixels. Lines of pixel data may be stored in the one or more lines of memory locations in the non-rectangular frame buffer 106. The lines of pixel data stored in the lines of memory locations may correspond to lines of pixels displayed on the non-rectangular display 102 where at least two lines of pixel data vary in length corresponding to at least two lines of pixels which also vary in length. In an example, the non-rectangular frame buffer 106 may store the pixel data associated with pixels displayed on the non-rectangular display 102, but not all the pixel data of pixels which would be visible on a rectangular display.

To illustrate, a square frame buffer 120 which is an example of a rectangular frame buffer may be a frame buffer which stores pixel data for pixels of a rectangular display which is Y pixels by Y pixels resulting in storing pixel data for $Y^2$ pixels in memory locations. The rectangular display may have Y lines of pixels each with a length of Y pixels. Each line of pixels on the display may correspond to a line of pixel data stored in a line of memory locations in the non-rectangular frame buffer 106. Each line of memory locations is uniform in a number of memory locations and stores a line of pixel data corresponding to a line of pixels. A number of pixel data in each line of pixel data and a number of pixels in each line may be uniform. In an example, a uniform number may mean a same number or a substantially same number. If the display 102 is round with a radius of Y/2 pixels, then the rectangular frame buffer would also store pixel data for $Y^2$ pixels but the non-rectangular frame buffer 106 may store pixel data for $(Y/2)\times(Y/2)\times\pi=(Y^2/4)\times\pi$ pixels. Circle 116 shows an example of the storage of pixel data for the display 102 in a non-rectangular frame buffer in the form of a circle. Circle 116 indicates storage of pixel data of pixels in memory locations of the non-rectangular frame buffer 106 and each line of pixels on the display 102 corresponds to a line of pixel data stored in a line of memory locations 118 in the non-rectangular frame buffer 106. In an example, different lines of memory locations 118 may have a different number of memory locations to follow the round shape of the display 102.

The circle 116 is a conceptual representation of the storage of the lines of memory locations 118 to simplify understanding of the non-rectangular frame buffer 106. The lines of memory locations 118 may be actually stored contiguously in the non-rectangular frame buffer 106. By storing the pixel data of pixels in the non-rectangular frame buffer 106 for the non-rectangular display 102 rather than a rectangular frame buffer approximately 21.5% of memory is saved compared to storing the pixel data in the rectangular frame buffer which in examples is a superset of the non-rectangular frame buffer:

$$\text{Useless pixels} = \frac{\text{circular area}}{\text{rectangular buffer}} 1 - \frac{\frac{Y^2}{4}\times\pi}{Y^2} = 1 - \frac{\pi}{4} \cong 21.5\%$$

For a 24 bit RGB display with dimensions of 800 pixels by 800 pixels and 3 bits per pixel (bpp), storing the pixel data in a non-rectangular frame buffer saves approximately 412 kB of memory:

800 pixels×800 pixels×3 bpp×21.5=412 kB per framebuffer

Further, for a refresh of the display at 60 frames per second (fps), storing the pixel data in a non-rectangular frame buffer saves 24 MB/second of bandwidth:

60 fps×412 kB=24 MB/s

The display controller 104 may access the non-rectangular frame buffer 106 by providing an address which identifies a memory location storing pixel data of a specific pixel. The address provided may be defined as if the non-rectangular frame buffer 106 is a rectangular frame buffer having lines of memory locations with a uniform number of memory locations where each line of memory locations stores a line of pixel data corresponding to a line of pixels. A number of pixel data and a number of pixels in each line may be uniform for the rectangular frame buffer. In some examples, the memory location indicated by the address does not correspond to a memory location in the non-rectangular frame buffer 106. For instance, the memory locations addressed may be at ends of lines of memory locations which store pixel data of pixels at ends of lines of pixels in a rectangular frame buffer. These pixels associated with the pixel data are not visible on the non-rectangular display 106 and the pixel data do not correspond to memory locations stored in the non-rectangular frame buffer 106.

Embodiments disclosed herein are directed to the GDAS 108 which performs an address translation of the address provided by the display controller 104 to perform a memory operation on a memory location in the non-rectangular frame buffer 106 corresponding to the memory location addressed. In an example, the GDAS 108 may be located between the bus 114 and the non-rectangular frame buffer 106 to facilitate this translation. In an example, the GDAS 108 may receive an address of a memory location from the display controller 104 to store or retrieve certain pixel data in the memory location. The display controller 104 may provide the address presuming that the memory location is in a rectangular frame buffer but the memory location may be actually in the non-rectangular frame buffer 106. The GDAS 108 may determine whether a memory location in the non-rectangular frame buffer 106 corresponds to the addressed memory location in the rectangular frame buffer. If the memory location in the non-rectangular frame buffer 106 corresponds to the addressed memory location in the rectangular frame buffer 106, then the GDAS 108 may perform an address translation from the address provided by the display controller 104 to an address in the non-rectangular frame buffer 106 and perform the memory operation on the memory location in the non-rectangular frame buffer 106. The GDAS 108 may then perform the memory operation based on the translated address such as the read or write access to the memory location. If no memory location in the non-rectangular frame buffer 106 corresponds to the addressed memory location in the rectangular frame buffer 106 and the memory operation is associated with a read access, then the GDAS 108 outputs arbitrary data. Further, if no memory location in the non-rectangular frame buffer 106 corresponds to the addressed memory location in the rectangular frame buffer 106 and the memory operation is associated with a write access, then the GDAS 108 does not perform the write access.

The display system 100 may have other components to facilitate display of image content on the display 102. For example, the display system 100 may also have a graphics processor (GP) 110 to generate image content in the non-rectangular frame buffer 106 which is then retrieved by the display controller 104 to illuminate pixels based on the pixel data. As another example, the display system 100 may have a blitter 112 which performs movement and modification of pixel data within the non-rectangular frame buffer 106 in parallel with the GP 110, while freeing up the GP 110 to perform other operations. A typical use for a butter 112 is the movement of a bitmap, such as associated with windows and fonts in a graphical user interface or images and backgrounds in a video game. The display system 100 may a central processing unit (CPU) 111 which may perform less time sensitive operations on the pixel data of pixel. The display system 100 may have other components as well.

Figure 2:
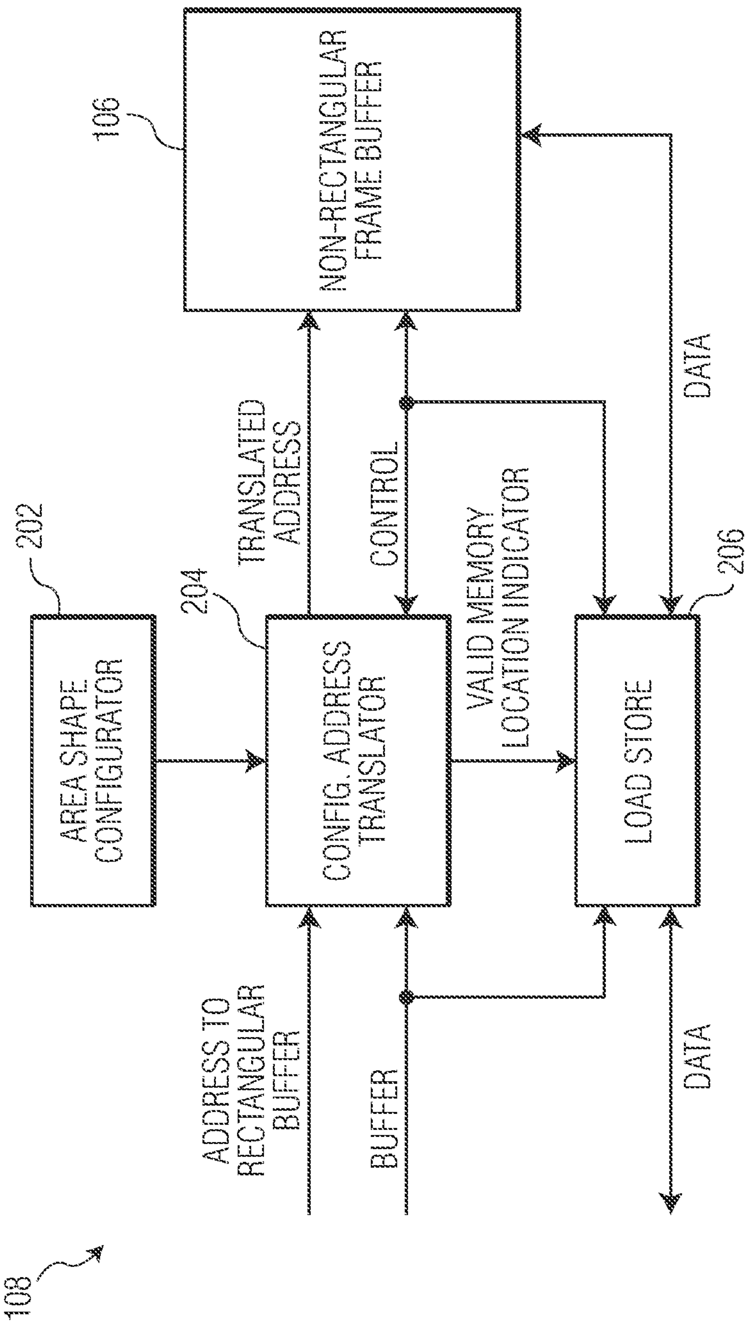
FIG. 2 is a block diagram of an example graphic data access system (GDAS) in accordance with an embodiment.

FIG. 2 is a block diagram of the example GDAS 108 in accordance with an embodiment. The GDAS 108 may comprise a plurality of submodules including an area shape configuration (ASC) 202, a configurable address translator (CAT) 204, and a load store (LS) 206.

The ASC 202 may define a shape of the non-rectangular display 102. In some examples, the shape may be the same as a viewing area on the non-rectangular display 102 such as a circle for a display 102.

The CAT 204 may receive an address and a control signal such as from the display controller 104. The address may be an address of a memory location which the display controller wants to store pixel data of a pixel to or retrieve pixel data for a pixel. In an example, address n may refer to pixel data stored in one memory location which stores pixel data for a pixel and address n+1 may refer to pixel data stored in another memory location which stores pixel data of a pixel, where n is an integer. The address may also be referred to as a pixel data address.

In an example, the address may presume the memory location is in a rectangular frame buffer 106 which the CAT 204 may translate to an address of a corresponding memory location in a non-rectangular frame buffer 106. The control signal may indicate whether a memory operation is a write operation or read operation in an example. If a write operation is to be performed, then the control signal may cause the CAT 204 to provide the translated address to the non-rectangular frame buffer 106 to perform the write operation in the corresponding memory location. If a read operation is to be performed, then the control signal may cause the CATU 204 to provide the translated address to the non-rectangular frame buffer 106 to perform the read operation in the corresponding memory location.

LS 206 may receive the data to be written to the non-rectangular frame buffer 106 for storage in the memory location or provide the data read from the memory location in the non-rectangular frame buffer 106. If a read operation is to be performed, then the LS 206 may retrieve the pixel data to be read from the non-rectangular frame buffer 106 and provide the read data to the display controller 104. If a write operation is to be performed, then the LS 206 may provide the pixel data to be written to the non-rectangular frame buffer 106. The CAT 204 may provide the control signal to the non-rectangular frame buffer 106 to indicate whether to perform the write operation or read operation. Further, the control signal to the non-rectangular frame buffer 106 may be also provided to the LS 206 to indicate when the LS 206 is to provide pixel data to the non-rectangular frame buffer 106 as part of a write operation or receive pixel data from the non-rectangular frame buffer 106 as part of a read operation.

In an example, the display controller 104 may presume that the memory location is in a rectangular frame buffer and provide the address. But because certain memory locations in a rectangular frame buffer may not be in the non-rectangular frame buffer 106, the memory location with the address provided by the display controller 104 may not correspond to a memory location in the non-rectangular buffer 106. Prior to the LS 206 accessing the non-rectangular frame buffer 106, the CAT 204 may provide an indication to the LS 206 such as a valid memory location indictor set to true or false to indicate whether the corresponding memory location is in the non-rectangular frame buffer 106. If the corresponding memory location is in the non-rectangular frame buffer 106, then the valid memory location indicator may be set to true and the LS 206 may perform the requested read operation or write operation. If the corresponding memory location is not in the non-rectangular frame buffer 106, then the valid memory location indicator may be set to false and the LS 206 may not perform the requested read operation or write operation. The LS 206 may ignore a write operation. Further, the LS 206 may return arbitrary data associated with a read operation. Further, the CAT 204 may not provide control data to the LS 206 and the non-rectangular frame buffer 106.

Figure 3:
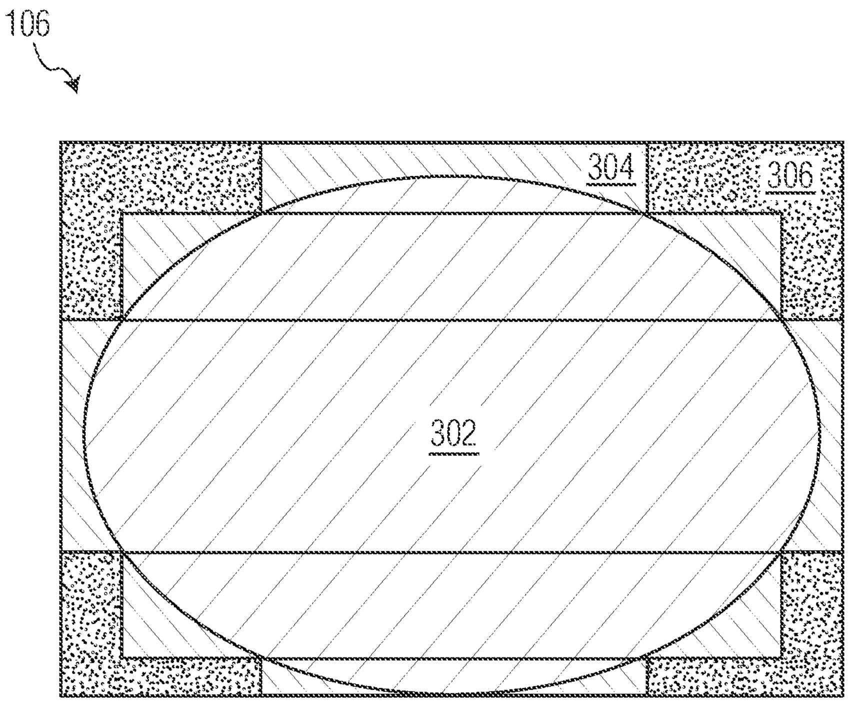
FIG. 3 illustrates an example non-rectangular frame buffer which stores pixel data of pixels in accordance with an embodiment.

FIG. 3 illustrates an example non-rectangular frame buffer 106 which stores pixel data of pixels in accordance with an embodiment. The non-rectangular frame buffer 106 may store in memory locations (not specifically shown) pixel data associated with pixels which are visible on the non-rectangular display screen shown by the cross-hatch shading 302. In an example, the non-rectangular frame buffer 106 may store pixel data associated with pixels which are not visible on the non-rectangular display screen 102 shown as cross-hatch shading 304 but collectively approximate a shape of the non-rectangular display 102. Additional pixel data of pixels which would be displayed on a rectangular display is shown as stubble shading 306. The additional pixel data shown as the stubble shading 306 may not be stored in the non-rectangular frame buffer 106 even though they would be stored in the rectangular frame buffer, resulting in a memory or bandwidth savings. In an example, the pixel data in the non-rectangular frame buffer 106 is referred to as being compressed compared to pixel data in the rectangular frame buffer because some of the pixel data in the shading 306 is excluded in the non-rectangular frame buffer 106. The non-rectangular frame buffer 106 may not store all the pixel data of pixels that would be otherwise stored in a rectangular frame buffer.

The CAT 204 may determine whether an address of a memory location in a rectangular frame buffer provided by the display controller 104 corresponds to a memory location in the non-rectangular frame buffer 106.

In one example, the ASC 202 or CAT 204 may store in a data structure such as a list the addresses of memory locations storing pixel data of pixels in the non-rectangular frame buffer 106 or calculate the address of memory locations storing pixel data of pixels in the visible area of the non-rectangular display 102 for each line of the pixel data. The address provided by the display controller 104 may be compared to the stored or calculated addresses to determine whether the address provided by the display controller 104 corresponds to a memory location in the non-rectangular frame buffer 106. The storage or calculation of the address of the pixel data associated with pixels in the visible area of the non-rectangular display 102 may allow for accurately determining whether an address of a memory location in a rectangular frame buffer provided by the display controller 104 corresponds to a memory location in the non-rectangular frame buffer 106 with a tradeoff of increased memory or computation requirements.

In another example, the non-rectangular frame buffer 106 may be segmented into segments each comprising lines of memory locations. The lines of memory locations in each segment may store lines of pixel data corresponding to lines of pixels where some pixels associated with the pixel data in the segment may be visible and others may not be visible on the non-rectangular display 102. Further, the memory locations of the segments may not store all the pixel data of pixels that would be stored in a rectangular frame buffer and visible on a rectangular display. The segments may define a bounding box of memory locations storing a plurality of pixel data corresponding to pixels which might or might not be displayed on a non-rectangular display 102. As discussed below, the organization of the memory locations in segments reduces complexity associated with determining whether an address of a memory location in a rectangular frame buffer corresponds to a memory location in the non-rectangular frame buffer 106. In an example, the address of memory locations storing pixels data of pixels in the non-rectangular frame buffer 106 or the visible area of a non-rectangular display 102 for each line of the memory locations do not need to be each calculated or stored in a list.

Figure 4:
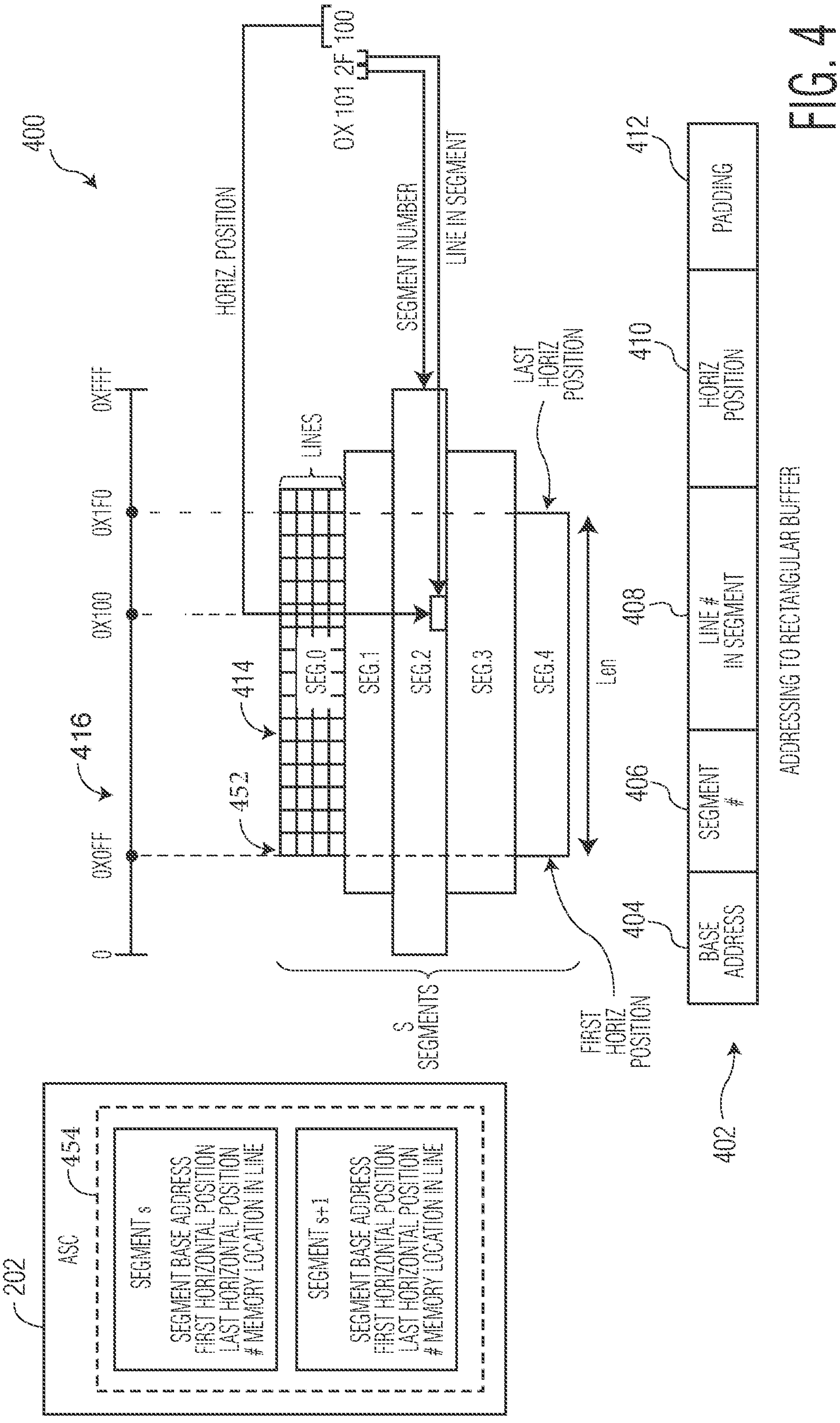
FIG. 4 illustrates an example plurality of segments of memory locations in the non-rectangular frame buffer for storing pixel data of pixels in accordance with an embodiment.

FIG. 4 illustrates an example plurality of segments 400 of memory locations in the non-rectangular frame buffer 106 for storing pixel data of pixels in accordance with an embodiment. In an example, the non-rectangular frame buffer 106 may be subdivided into S segments which in this example is S=5 segments where each segment is identified as s ranging from s=0 to 4. Each segment may have a number of memory locations in a line and have L lines of memory locations in each segment which are contiguous lines. For example, the segment 0 in the example may have four lines of memory locations in a vertical direction with 16 memory locations 414 per line in a horizontal direction. A number of lines of memory locations in each segment may be the same in an example. Further, a segment may have a length equal to a maximum number of memory locations in a line of the segment. Each line in a segment has a uniform number of memory locations but at least two segments may have a different number of memory locations in a line such that lengths of the segments approximate a shape of the non-rectangular display 106. Each line of memory locations may store a line of pixel data which correspond to a line of pixels that would be displayed on the non-rectangular display 106. In an example, one or more of the number of segments S, lines L in each segment, and number of pixel data in each line may be a power of 2. To reduce storage requirements in memory, each segment from s=0 to S−1 non-rectangular frame buffer may be stored in the non-rectangular frame buffer 106 such that pixel data of a segment s may be stored contiguously after pixel data for a segment s−1.

An address may identify a memory location in a rectangular frame buffer. The memory location may be used to store pixel data of a pixel. Address 402 is an example representation of such an address for a rectangular frame buffer. The address 402 may have a plurality of fields 404-412 of bits including one or more of a base address 404 of the rectangular frame buffer which identifies a beginning address of the rectangular frame buffer, a segment number 406 of a segment in the rectangular frame buffer, a line number 408 in the segment, a horizontal position 410 in the segment, and optional padding bits 412 to byte align the address 402.

In an example, the rectangular frame buffer may be arranged with a same number of segments and a same number of lines of memory locations in each segment as the non-rectangular buffer 106. In an example, at least two segments may have lines with a different number of memory locations in the non-rectangular frame buffer 106 compared to the rectangular frame buffer where all segments may have lines with a same number of memory locations. The display controller 104 in an example may provide the address 402 associated with memory location in a rectangular frame buffer even though pixel data of pixels displayed on the non-rectangular display 102 are stored in the non-rectangular frame buffer 106. The address 402 of a memory location in the rectangular frame buffer may be translated to an address of a corresponding memory location in the non-rectangular frame buffer 106. In an example, the corresponding memory location may store same pixel data as would be stored in the memory location of the rectangular frame buffer. To perform this translation, the address 402 may be parsed to identify the fields of the address 402.

As an example, the GDAS 108 may receive an address of 0x1012F100. The address of 0x1012F100 may indicate the rectangular frame buffer begins at base address 0x101. The base address indicates a start of the rectangular frame buffer (which is not shown). The address may further indicate the memory location is located in segment 2, at line 0xF, and at horizontal position 0x100.

The translation may then proceed with determining an address of the segment identified in the address 402 in the non-rectangular buffer 106. The ASC 202 may indicate an address of each segment in the non-rectangular frame buffer to the CAT 204. In an example, the ASC 202 may have a memory 454 which stores a base address (e.g., a bit value) where each segment starts in the non-rectangular buffer such as point 452. The CAT 204 may provide the identification of segment 2 in the address 402 to the ASC and receive an address in the non-rectangular buffer 106 where the segment 2 starts.

The CAT 204 may determine an address of the line in the segment indicated by the address 402 in the non-rectangular buffer 106. A reference line 416 in a horizontal direction may have discrete values and each discrete value may correspond to a memory location 414. The discrete values may range from a minimum value to a maximum value which spans a number of memory locations of each line of memory locations for the rectangular buffer. The minimum value may be 0x000 and the maximum value may be 0xFFF for a rectangular frame buffer as an example. In an example, the segment 0 may have lines of memory locations each with 0x0F1 (0X1F0-0X0FF=0x0F1) memory locations based on the reference line 416. In the example, segment 2 may have lines of memory locations with 0XFFF memory locations based on the reference line 416. The ASC 202 may store in the memory 454 an indication of a number of memory locations in the lines of the memory locations for each segment of the non-rectangular buffer 106 with respect to the reference line 416. For example, the ASC 202 may store an indication that segment 0 has 0x0F1 memory locations while segment 2 has 0xFFF memory locations. The number of memory locations is needed in the translation to calculate an address of a memory location of a line in the segment of the non-rectangular buffer 106 because the number of memory locations in the lines of different segments vary unlike in a rectangular frame buffer where lines are uniform. The address of the line indicated by the address 402 in the non-rectangular buffer 106 is determined by the following calculation: number of lines x number of memory locations in the lines of the segment+base address of the segment.

The address 402 may further indicate a horizontal position in the rectangular frame buffer. The horizontal position may be with reference to the reference line 416. The translation of the address 402 may further comprise determining an address of the horizontal position in the non-rectangular frame buffer 106. The ASC 202 may indicate in the memory 454 a first horizontal position and last horizontal position of memory locations 414 for each segment based on the reference line 416. For example, segment 2 in the non-rectangular frame buffer 106 may be indicated to have a first horizontal position of 0x000 and last horizontal position of 0xFFF with respect to reference line 416. As another example, segment 4 in the non-rectangular frame buffer 106 may be indicated to have a first horizontal position of 0xOFF and a last horizontal position of 0x1F0 with respect to the reference line 416. If the horizontal position indicated in the address 402 is between the first horizontal position and the last horizontal position, then the memory location indicated by the address 402 in a rectangular buffer corresponds to a memory location in the non-rectangular frame buffer 106. The address of the corresponding memory location is calculated as: address of the line+the horizontal position−first horizontal position. The GDAS 108 may use the calculated address to perform a memory operation such as storing pixel data of a pixel in the memory location of the calculated address or retrieve pixel data from the corresponding memory location. If the horizontal position indicated in the address 402 is not between the first horizontal position and the last horizontal position, then the memory location indicated by the address 402 does not identify a corresponding memory location in the non-rectangular frame buffer 106 and the translation is terminated. Further, the LS 206 may ignore a write operation or return arbitrary data associated with a read operation.

Figure 5:
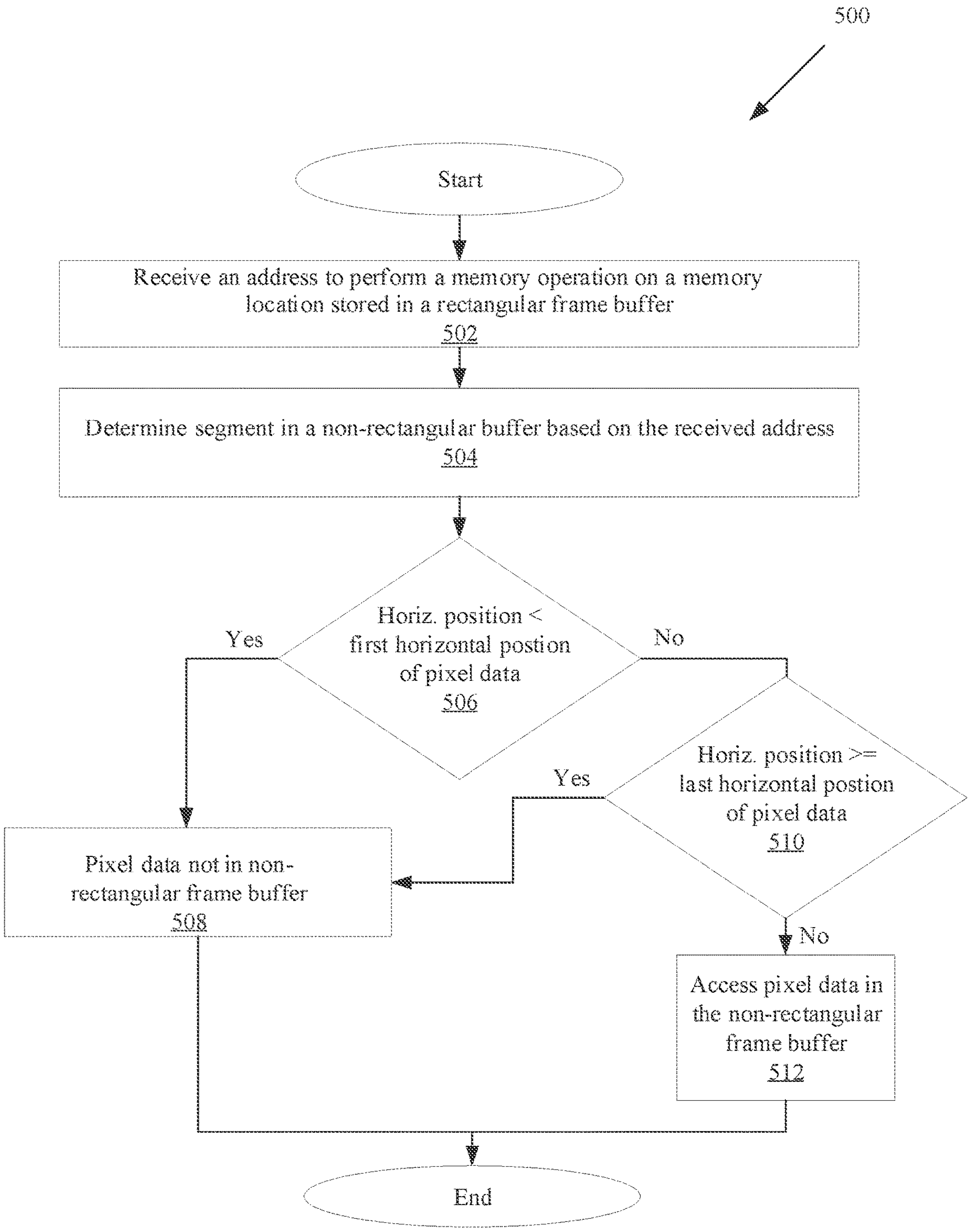
FIG. 5 is a flow chart of example functions associated with performing a memory operation in the non-rectangular frame buffer based on an address of a memory location in a rectangular frame buffer in accordance with an embodiment.

FIG. 5 is a flow chart of example functions associated with performing a memory operation in the non-rectangular frame buffer 106 based on an address of a memory location in a rectangular frame buffer in accordance with an embodiment. The functions 500 may be performed by the GDAS 108 in an example.

At 502, an address is received to perform a memory operation on a memory location stored in a rectangular buffer. The address may be received by the GDAS 108. In an example, the address may be provided by the display controller 104. The address may be formatted with fields 404-412. At 504, the segment is determined based on the address. Field 406 may identify the segment which may be in the non-rectangular frame buffer 106. A horizontal position 410 may be a position of the memory location along a line of memory locations in the rectangular frame buffer. At 506, the horizontal position is compared to the first horizontal position of memory locations in the segment indicated by the ASC 302. If the horizontal position 410 is less than a first horizontal position of memory locations in the non-rectangular buffer 106 indicated by the ASC 302, then at 508 a memory location corresponding to the addressed memory location in the rectangular frame buffer is not in the non-rectangular buffer 106. If the horizontal position 410 is not less than a first horizontal position of memory locations, then at 510 the horizontal position 510 may be compared to a last horizontal position of memory locations in the segment indicated by the ASC 302. If the horizontal position 510 is greater than the last horizontal position, then processing moves to 508. If the horizontal position is not greater than the last horizontal position, then at 512, a memory location corresponding to the addressed memory location in the rectangular frame buffer is in the non-rectangular buffer 106. In an example, the address of the corresponding memory location in the non-rectangular frame buffer 106 (translated address) to the memory location in the rectangular buffer may be computed as Address=StartAddr[Segment#]+LineNo*LineLength[segment#]+HorizontalPos−First Horizontal Position where LineLength can be derived based on a difference of (lastHorizontalPosition-firstHorizontalPosition) or indicated by the ASC 202.

In the examples described above, the GDAS 108 is positioned between the bus 114 and the non-rectangular frame buffer 106. Further, the non-rectangular frame buffer 106 may comprise a plurality of memory banks. The GDAS 108 may be implemented as a plurality of GDAS each associated with a particular memory bank of the non-rectangular buffer 106 increasing hardware complexity. The memory bank may comprise memory in a range of addresses. To reduce this complexity, a respective GDAS may be positioned between the display controller 104, GPU 110, or blitter 112 and bus 114 instead of between the bus 114 and the non-rectangular frame buffer 106. This positioning of the GDAS may decrease hardware complexity because fewer instances of the GDAS may be needed in the example display system 100 compared to having the plurality of GDAS each associated with a particular memory bank in the non-rectangular buffer 106. Additionally, latency in determining whether pixel data is in the non-rectangular buffer 106 may be reduced since a bus access is avoided if the pixel data is not in the non-rectangular buffer 106.

In one embodiment, a method for performing a memory operation in a non-rectangular frame buffer is disclosed. The method comprises: receiving an address to perform the memory operation on a memory location in a rectangular frame buffer, wherein the rectangular frame buffer has a plurality of lines of memory locations, wherein the plurality of lines of memory locations in the rectangular frame buffer each have a uniform number of memory locations and each line of memory locations in the rectangular frame buffer is to store a line of pixel data corresponding to a line of pixels displayed on a rectangular display which displays a plurality of lines of pixels; determining whether the received address indicates a memory location in the non-rectangular frame buffer corresponding to the memory location in the rectangular frame buffer, wherein the non-rectangular frame buffer has a plurality of lines of memory locations, wherein at least two lines of the plurality of lines of memory locations in the non-rectangular frame buffer each have a different number of memory locations, each memory location in the non-rectangular frame buffer stores pixel data of a pixel and each line of memory locations in the non-rectangular frame buffer is to store a line of pixel data corresponding to a line of pixels displayed on a non-rectangular display which displays a plurality of lines of pixels; and based on the determination that the received address identifies the memory location in the non-rectangular buffer, performing the memory operation on the memory location in the non-rectangular buffer. In an embodiment, determining whether the received address identifies a memory location in a non-rectangular frame buffer comprises comparing a horizontal position indicated by the received address with a first horizontal position and last horizontal position defining a segment of memory locations in the non-rectangular buffer; and determining that the memory location is in the non-rectangular frame buffer based on the horizontal position being between the first horizontal position and the last horizontal position. In an embodiment, the method further comprises based on the determination that the received address does not identify the memory location in the non-rectangular buffer, not performing the memory operation in the non-rectangular frame buffer, wherein the received address is associated with a read or write memory operation and not performing the memory operation comprises outputting arbitrary data associated with the read memory operation or ignoring the write memory operation. In an embodiment, the received address comprises one or more of a segment number of a segment in the rectangular frame buffer with the memory location, a line number of a line of memory locations in the segment with the memory location, and a horizontal position of the memory location in the segment. In an embodiment, the method further comprises determining based on the received address a segment which forms a bounding box around one or more contiguous lines of memory locations in the non-rectangular frame buffer, wherein the non-rectangular frame buffer has a plurality of segments. In an embodiment, a respective segment is rectangular in shape with a number of memory locations in each line of memory locations of the respective segment being the same; and wherein at least two segments have respective lines with a different number of memory locations. In an embodiment, the pixels of the non-rectangular display are arranged in an elliptical shape. In an embodiment, receiving the address comprises receiving the address from one or more of a display controller coupled to the non-rectangular display, a graphic processing unit, a central processing unit, and a blitter.

In another embodiment, a display system is disclosed. The display system comprises: an address translator configured to receive an address to perform a memory operation on a memory location in a rectangular frame buffer, wherein the rectangular frame buffer has a plurality of lines of memory locations, wherein the plurality of lines of memory locations in the rectangular frame buffer each have a uniform number of memory locations and each line of memory locations in the rectangular frame buffer is to store a line of pixel data corresponding to a line of pixels displayed on a rectangular display which displays a plurality of lines of pixels; determine whether the received address identifies a memory location in the non-rectangular frame buffer corresponding to the memory location in the rectangular frame buffer, wherein the non-rectangular frame buffer has a plurality of lines of memory locations, wherein at least two lines of the plurality of lines of memory locations in the non-rectangular frame buffer each have a different number of memory locations, each memory location in the non-rectangular frame buffer stores pixel data of a pixel, and each line of memory locations in the non-rectangular frame buffer is to store a line of pixel data corresponding to a line of pixels displayed on a non-rectangular display which displays a plurality of lines of pixels; and a load store configured based on the determination that the received address indicates a memory location in the non-rectangular buffer to perform the memory operation on the memory location in the non-rectangular buffer. In an embodiment, the address translator configured to determine whether the received address identifies a memory location in a non-rectangular frame buffer comprises the address translator configured to compare a horizontal position indicated by the received address with a first horizontal position and last horizontal position defining a segment of memory locations in the non-rectangular buffer; and determine that the memory location is in the non-rectangular frame buffer based on the horizontal position being between the first horizontal position and the last horizontal position. In an embodiment, the display system further comprises an area shape configurator configured to store an indication of a first horizontal position and a last horizontal position of each segment in the non-rectangular frame buffer and provide the indication to the address translator. In an embodiment, the load store is further configured based on the determination that the received address does not identify the memory location in the non-rectangular buffer to not perform the memory operation in the non-rectangular frame buffer, wherein the received address is associated with a read or write memory operation and the load store configured to not perform the memory operation comprises the load store configured to output arbitrary data associated with the read memory operation or to ignore the write memory operation. In an embodiment, the received address comprises one or more of a segment number of a segment in the rectangular frame buffer with the memory location, a line number of a line of memory locations in the segment with the memory location, and a horizontal position of the memory location in the segment. In an embodiment, the display system further comprises the address translator configured to determine based on the received address a segment which forms a bounding box around one or more contiguous lines of memory locations in the non-rectangular frame buffer which comprises the memory location, wherein the non-rectangular frame buffer has a plurality of segments. In an embodiment, a respective segment is rectangular in shape with a number of memory locations in each line of memory locations of the respective segment being the same; and wherein at least two segments have respective lines with a different number of memory locations. In an embodiment, the pixels of the non-rectangular display are arranged in an elliptical shape. In an embodiment, the address translator configured to receive the address comprises the address translator configured to receive the address from one or more of a display controller coupled to the non-rectangular display, a graphic processing unit, a central processing unit, and a blitter. In an embodiment, the address translator is further configured to provide an indicator to the load store to indicate whether the memory location is in the non-rectangular frame buffer; and the load store is further arranged to perform or not perform the memory operation based on the indicator. In an embodiment, the display system further comprises a display controller and a graphic data access system comprising the address translator and the load store, wherein the graphic data access system is coupled between a bus and the non-rectangular frame buffer and the bus enables communication between the graphic data access system and the display controller. In an embodiment, the display system further comprises a graphic data access system comprising the address translator and the load store, wherein the graphic data access is coupled between a display controller and a bus; and wherein the bus enables communication between the graphic data access system and the non-rectangular frame buffer.

An address to perform a memory operation on a memory location in a rectangular frame buffer is received. A determination is made whether the received address identifies a memory location in a non-rectangular frame buffer corresponding to a memory location in the rectangular frame buffer. Based on the determination that the received address identifies the memory location in the non-rectangular buffer, the memory operation on the memory location in the non-rectangular buffer is performed based on the translated address. Based on the determination that the received address does not identify the memory location in the non-rectangular buffer, the memory operation in the non-rectangular frame buffer is not performed.

A few implementations have been described in detail above, and various modifications are possible. The disclosed subject matter, including the functional operations described in this specification, can be implemented in electronic circuitry, computer hardware, firmware, software, or in combinations of them, such as the structural means disclosed in this specification and structural equivalents thereof: including potentially a program operable to cause one or more data processing apparatus such as a processor to perform the operations described (such as program code encoded in a non-transitory computer-readable medium, which can be a memory device, a storage device, a machine-readable storage substrate, or other physical, machine readable medium, or a combination of one or more of them).

While this specification contains many specifics, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

Other implementations fall within the scope of the following claims.

The invention claimed is:

1. A method for performing a memory operation in a non-rectangular frame buffer comprising:

receiving an address to perform the memory operation on a memory location in a rectangular frame buffer, wherein the rectangular frame buffer has a plurality of lines of memory locations, wherein the plurality of lines of memory locations in the rectangular frame buffer each have a uniform number of memory locations and each line of memory locations in the rectangular frame buffer is to store a line of pixel data corresponding to a line of pixels displayed on a rectangular display which displays a plurality of lines of pixels;

determining, by a graphic data access system, whether the received address indicates a memory location in the non-rectangular frame buffer corresponding to the memory location in the rectangular frame buffer, wherein the non-rectangular frame buffer has a plurality of lines of memory locations, wherein at least two lines of the plurality of lines of memory locations in the non-rectangular frame buffer each have a different number of memory locations, each memory location in the non-rectangular frame buffer stores pixel data of a pixel and each line of memory locations in the non-rectangular frame buffer is to store a line of pixel data corresponding to a line of pixels displayed on a non-rectangular display which displays a plurality of lines of pixels; and based on the determination that the received address identifies the memory location in the non-rectangular buffer, accessing the non-rectangular buffer via a bus located between the graphics data access system and the non-rectangular buffer to perform the memory operation on the memory location, wherein a number of the plurality of lines in the non-rectangular frame buffer is a power of two and a number of pixel data in each line in the non-rectangular frame buffer is a power of two.

2. The method of claim 1, wherein determining whether the received address identifies a memory location in a non-rectangular frame buffer comprises comparing a horizontal position indicated by the received address with a first horizontal position and last horizontal position defining a segment of memory locations in the non-rectangular buffer; and determining that the memory location is in the non-rectangular frame buffer based on the horizontal position being between the first horizontal position and the last horizontal position.

3. The method of claim 1, further comprising based on the determination that the received address does not identify the memory location in the non-rectangular buffer, not performing the memory operation in the non-rectangular frame buffer, wherein the received address is associated with a read or write memory operation and not performing the memory operation comprises outputting arbitrary data associated with the read memory operation or ignoring the write memory operation.

4. The method of claim 1, wherein the received address comprises one or more of a segment number of a segment in the rectangular frame buffer with the memory location, a line number of a line of memory locations in the segment with the memory location, and a horizontal position of the memory location in the segment.

5. The method of claim 1, further comprising determining based on the received address a segment which forms a bounding box around one or more contiguous lines of memory locations in the non-rectangular frame buffer, wherein the non-rectangular frame buffer has a plurality of segments and a number of the plurality of segments is a power of two.

6. The method of claim 5, wherein a respective segment is rectangular in shape with a number of memory locations in each line of memory locations of the respective segment being the same; and wherein at least two segments have respective lines with a different number of memory locations.

7. The method of claim 1, wherein the pixels of the non-rectangular display are arranged in an elliptical shape.

8. The method of claim 1, wherein receiving the address comprises receiving the address from one or more of a display controller, a graphic processing unit, a central processing unit, and a blitter.

9. A display system comprising:

an address translator configured to receive an address to perform a memory operation on a memory location in a rectangular frame buffer, wherein the rectangular frame buffer has a plurality of lines of memory locations, wherein the plurality of lines of memory locations in the rectangular frame buffer each have a uniform number of memory locations and each line of memory locations in the rectangular frame buffer is to store a line of pixel data corresponding to a line of pixels displayed on a rectangular display which displays a plurality of lines of pixels; determine whether the received address identifies a memory location in a non-rectangular frame buffer corresponding to the memory location in the rectangular frame buffer, wherein the non-rectangular frame buffer has a plurality of lines of memory locations, wherein at least two lines of the plurality of lines of memory locations in the non-rectangular frame buffer each have a different number of memory locations, each memory location in the non-rectangular frame buffer stores pixel data of a pixel, and each line of memory locations in the non-rectangular frame buffer is to store a line of pixel data corresponding to a line of pixels displayed on a non-rectangular display which displays a plurality of lines of pixels;

a load store configured based on the determination that the received address indicates a memory location in the non-rectangular buffer to perform the memory operation on the memory location in the non-rectangular buffer by access to a bus; and a graphic data access system comprising the address translator and load store, wherein the bus is located between the graphic data access system and the non-rectangular frame buffer; and wherein a number of the plurality of lines in the non-rectangular frame buffer is a power of two and a number of pixel data in each line in the non-rectangular frame buffer is a power of two.

10. The display system of claim 9, wherein the address translator configured to determine whether the received address identifies a memory location in a non-rectangular frame buffer comprises the address translator configured to compare a horizontal position indicated by the received address with a first horizontal position and last horizontal position defining a segment of memory locations in the non-rectangular buffer; and determine that the memory location is in the non-rectangular frame buffer based on the horizontal position being between the first horizontal position and the last horizontal position.

11. The display system of claim 10, further comprising an area shape configurator configured to store an indication of a first horizontal position and a last horizontal position of each segment in the non-rectangular frame buffer and provide the indication to the address translator.

12. The display system of claim 9, wherein the load store is further configured based on the determination that the received address does not identify the memory location in the non-rectangular buffer to not perform the memory operation in the non-rectangular frame buffer, wherein the received address is associated with a read or write memory operation and the load store configured to not perform the memory operation comprises the load store configured to output arbitrary data associated with the read memory operation or to ignore the write memory operation.

13. The display system of claim 9, wherein the received address comprises one or more of a segment number of a segment in the rectangular frame buffer with the memory location, a line number of a line of memory locations in the segment with the memory location, and a horizontal position of the memory location in the segment.

14. The display system of claim 9, further comprising the address translator configured to determine based on the received address a segment which forms a bounding box around one or more contiguous lines of memory locations in the non-rectangular frame buffer which comprises the memory location, wherein the non-rectangular frame buffer has a plurality of segments and a number of the plurality of segments is a power of two.

15. The display system of claim 14, wherein a respective segment is rectangular in shape with a number of memory locations in each line of memory locations of the respective segment being the same; and wherein at least two segments have respective lines with a different number of memory locations.

16. The display system of claim 9, wherein the pixels of the non-rectangular display are arranged in an elliptical shape.

17. The display system of claim 9, wherein the address translator configured to receive the address comprises the address translator configured to receive the address from one or more of a display controller, a graphic processing unit, a central processing unit, and a blitter.

18. The display system of claim 9, wherein the address translator is further configured to provide an indicator to the load store to indicate whether the memory location is in the non-rectangular frame buffer; and the load store is further arranged to perform or not perform the memory operation based on the indicator.

* * * * *